United States Patent [19]

Okuyama et al.

[11] Patent Number: 4,737,692
[45] Date of Patent: Apr. 12, 1988

[54] PINCUSHION DISTORTION CORRECTION DEVICE

[75] Inventors: Nobutaka Okuyama; Toshiharu Shimizu; Kunio Ando; Hitoshi Maekawa; Hiroki Ooguro; Masao Obara, all of Yokohama, Japan

[73] Assignee: Hitachi, Ltd., Tokyo, Japan

[21] Appl. No.: 791,342

[22] Filed: Oct. 25, 1985

[30] Foreign Application Priority Data

Oct. 29, 1984 [JP] Japan .................. 59-225709
Feb. 14, 1985 [JP] Japan .................. 60-25210

[51] Int. Cl.$^4$ ............................. H01J 29/56
[52] U.S. Cl. ................................. 315/371
[58] Field of Search ............ 313/421, 440; 315/370, 315/371

[56] References Cited

U.S. PATENT DOCUMENTS

| | | | |
|---|---|---|---|
| 3,440,482 | 4/1969 | Lister et al. ................. | 315/370 |
| 3,735,193 | 5/1973 | Ikeuchi ........................ | 315/370 |
| 3,760,222 | 9/1973 | Smith .......................... | 315/371 |
| 3,916,254 | 10/1975 | Worster et al. ............. | 315/371 |
| 3,983,450 | 9/1976 | Lehnert ....................... | 315/370 |
| 4,318,035 | 3/1982 | Fitzgerald ................... | 315/371 |
| 4,636,693 | 1/1987 | Saruta ......................... | 315/370 |

FOREIGN PATENT DOCUMENTS 52-32927  8/1977  Japan .

Primary Examiner—Theodore M. Blum
Assistant Examiner—David Cain
Attorney, Agent, or Firm—Antonelli, Terry & Wands

[57] ABSTRACT

A deflection yoke unit to be mounted on a cathode ray tube has a core on which a set of vertical deflection coils and a set of horizontal deflection coils are wound. A pincushion distortion correction device is provided for the deflection yoke unit. The correction device has a set of correction coils having a coil conductor mass quantity and an inductance which are smaller than those of the vertical deflection coil set and having a winding density distribution which is similar to that of the vertical deflection coil set. An upper and lower pincushion distortion correction current is passed through the correction coil set to correct upper and lower pincushion distortions in pictures displayed on a screen of the cathode ray tube. The core has, on its inner wall, slots in which windings of the horizontal deflection coil set, vertical deflection coil set and correction coil set for correction of the upper and lower pincushion picture distortions are received. A plurality of winding guide claw members having each two or three slots are attached to a front open end and a rear open end of the core, respectively. Front end conductors of the respective coil sets are separately placed in the slots at the front open end of the core and rear end conductors of the respective coil sets are separately placed in the slots at the rear open end of the core.

6 Claims, 6 Drawing Sheets

PINCUSHION DISTORTION CORRECTION DEVICE

BACKGROUND OF THE INVENTION

This invention relates to a correction device for correcting upper and lower pincushion distortions in pictures displayed on a color picture tube provided with an electromagnetic deflection unit, and more particularly to an upper and lower pincushion distortion correction device suitable for a high speed horizontal deflection at a frequency of, for example, 130 KHz.

In a display apparatus such as a color picture tube using a deflection yoke unit adapted for generation of a magnetic field of a substantially uniform field distribution, there occur, in rasters at upper and lower portions of a screen, picture distortions in the form of a pincushion (hereinafter referred to as upper and lower pincushion distortions). Accordingly, it has hitherto been proposed to superimpose a correction current for correction of upper and lower pincushion distortions upon a vertical deflection current flowing through vertical deflection coils, as disclosed in U.S. Pat. No. 3,760,222. However, in high-definition display using a high frequency (about 130 KHz) for horizontal deflection, a horizontal component leaks into a vertical component with the result that a ringing current is generated in the vertical deflection current owing to the horizontal component or its higher harmonics.

Japanese Patent Publication No. 52-32927 discloses an expedient wherein an auxiliary deflection coil is disposed behind a main deflection coil assembly, and a current for correcting upper and lower pincushion distortions is supplied to the auxiliary deflection coil. This expedient has succeeded in preventing the ringing current in the auxiliary deflection coil but raises a problem that the current flowing through the auxiliary deflection coil will change the deflection center to thereby change conditions for electron beam landing on the fluorescent screen.

SUMMARY OF THE INVENTION

An object of this invention is to provide an upper and lower pincushion distortion correction device capable of efficiently correcting upper and lower distortions even when the horizontal deflection frequency is high.

According to this invention, a set of correction coils are disposed to oppose a set of horizontal deflection coils with interposition of a set of vertical deflection coils provided with a ringing prevention therebetween, and the correction coil has a substantially identical configuration to that of the vertical deflection coil and has an inductance and a conductor mass quantity which are smaller than those of the vertical deflection coil. Thus, the correction coil set produces a substantially identical magnetic field distribution (non-homogeneous) to that (non-homogeneous) of the vertical deflection coil set and therefore, the electron correction coil set will not disturb the beam landing conditions. In addition, lesser conductor mass quantity of the correction coil and interspace between the correction coil set and the horizontal coil set are effective to decrease capacitive coupling between the correction coil set and the horizontal deflection coil set, thereby preventing the generation of a ringing in the correction current.

DESCRIPTION OF THE PREFERRED EMBODIMENTS

Figure 1:
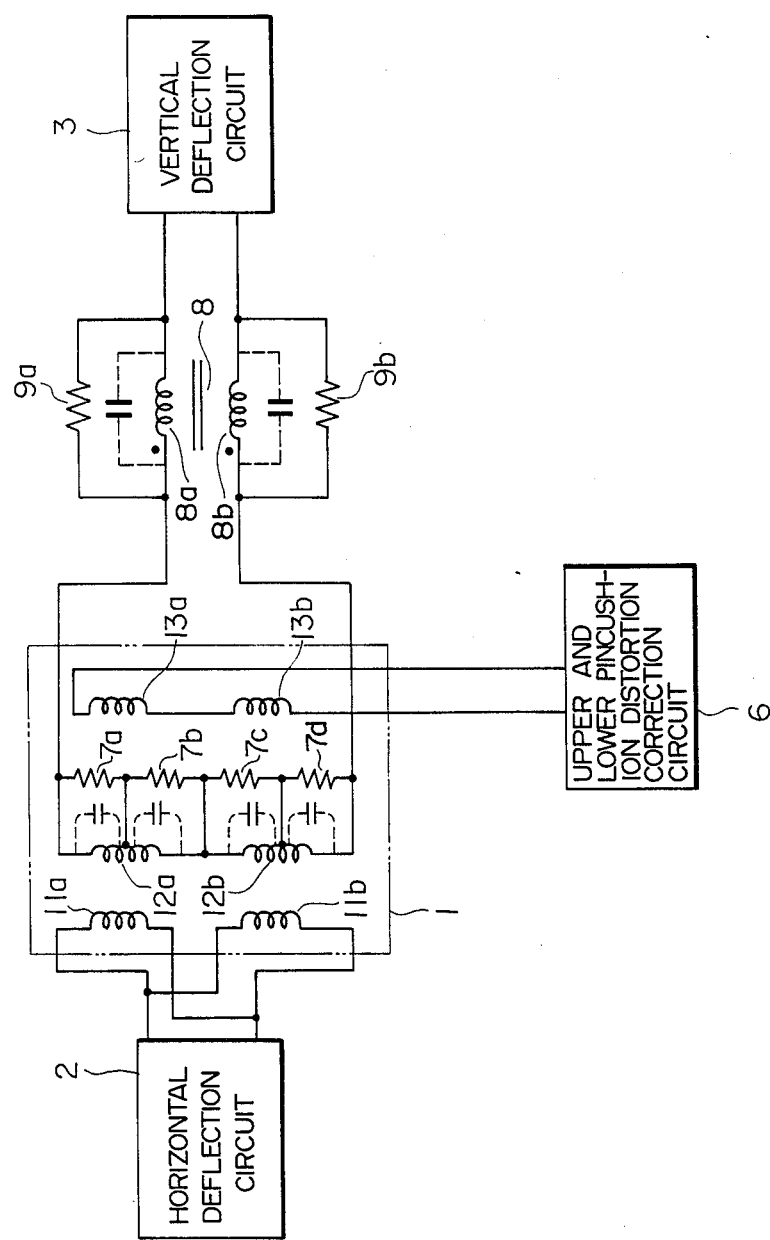
FIG. 1 is a circuit diagram showing an embodiment of the invention.

Referring to FIG. 1, there is illustrated a circuit diagram of an arrangement of a pincushion distortion correction device embodying the invention. The arrangement comprises a deflection yoke unit 1 including a set of horizontal deflection coils 11a and 11b, a set of vertical deflection coils 12a and 12b and a set of correction coils 13a and 13b, a horizontal deflection circuit 2 for supplying a horizontal deflection current to the horizontal deflection coils 11a and 11b connected in parallel, a vertical deflection circuit 3 for supplying a vertical deflection current to the vertical deflection coils 12a and 12b connected in series, and an upper and lower pincushion distortion correction circuit 6 for generating a deflection signal having such a wavefrom which is obtained by modulating the vertical deflection current for each period of the horizontal deflection current and supplying the deflection current to the correction coils 13a and 13b connected in series.

In order to prevent generation of a ringing in the vertical deflection current due to leakage of a horizontal component or its higher harmonics from the set of horizontal deflection coils 11a and 11b to the set of vertical deflection coils 12a and 12b through capacitive coupling, there is provided a ringing prevention means which comprises damping resistors 7a, 7b, 7c and 7d, and a transformer 8. The vertical deflection coil 12a has a center tap and the damping resistors 7a and 7b are connected in parallel with respective halves of the coil 12a. Likewise, the vertical deflection coil 12b has a center tap and the damping resistors 7c and 7d are connected in parallel with halves of the coil 12b, respectively. The transformer 8, interposed between the set of vertical deflection coils 12a and 12b and the vertical deflection circuit 3, is designed to exhibit a low impedance against an antiphase component of a low frequency signal such as a vertical deflection frequency signal but a high impedance against an in-phase component of a high frequency signal such as a horizontal deflection frequency signal. Thus, the transformer 8 has windings 8a and 8b which are magnetically coupled so as to provide a negative mutual inductance. Since the windings 8a and 8b are each associated with a distributed capacitance to form a resonance circuit, resistors 9a and 9b are respectively connected in parallel with the windings 8a and 8b to damp the resonance circuits. The vertical deflection current at a low frequency will flow through the windings 8a and 8b in antiphase relationship whereas a ringing component at a high frequency which leaks from the horizontal deflection coil set 11 will flow through the windings 8a and 8b in in-phase relationship. Consequently, the transformer 8 can suppress the ringing component without affecting the vertical deflection current. In addition, since energy storage in the resonance circuits constituted by the windings 8a and 8b and distributed capacitances associated therewith can be prevented by the resistors 9a and 9b, the effect of ringing suppression can be enhanced.

The deflection yoke unit 1 will now be described in greater detail.

Figure 2A:
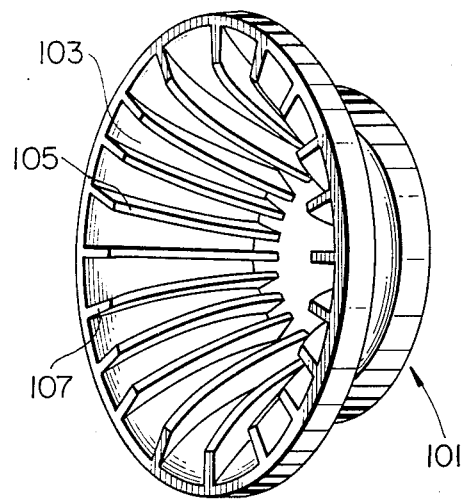
FIGS. 2(A), 2(B) are perspective views each showing a core of a deflection yoke unit.
Figure 2B:
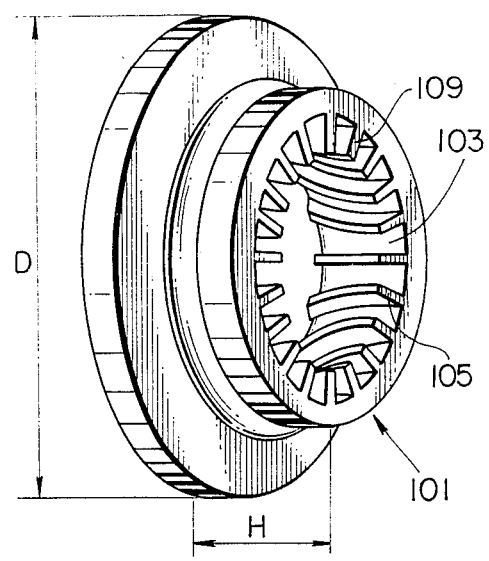
Figure 3A:
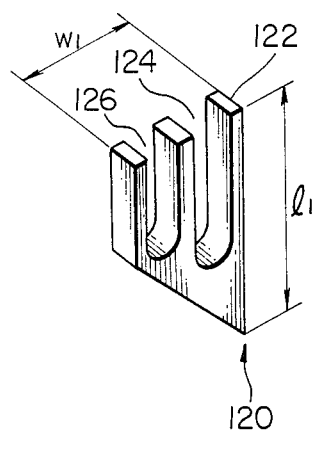
FIGS. 3(A), 3(B) are perspective views each showing bobbin claw members.
Figure 3B:
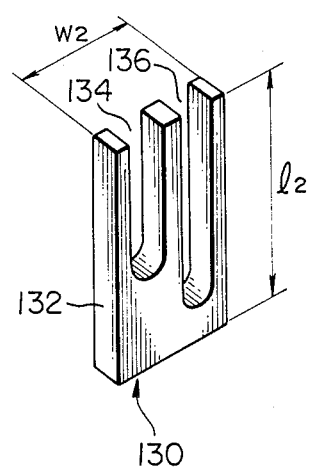
Figure 4:
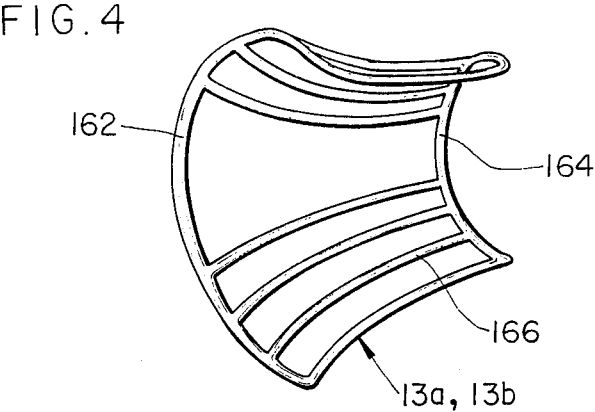
FIG. 4 is a perspective view of a correction coil.
Figure 5:
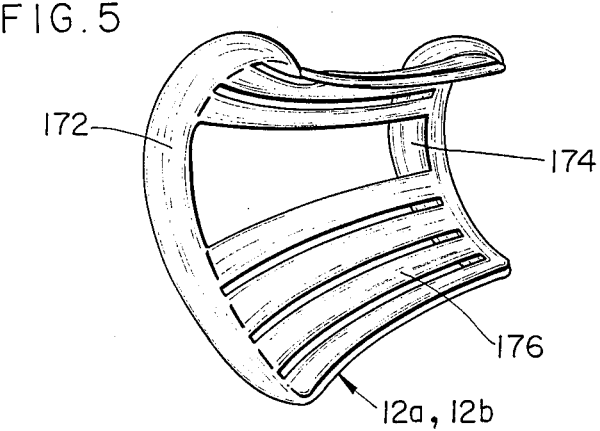
FIG. 5 is a perspective view of a vertical deflection coil.
Figure 6:
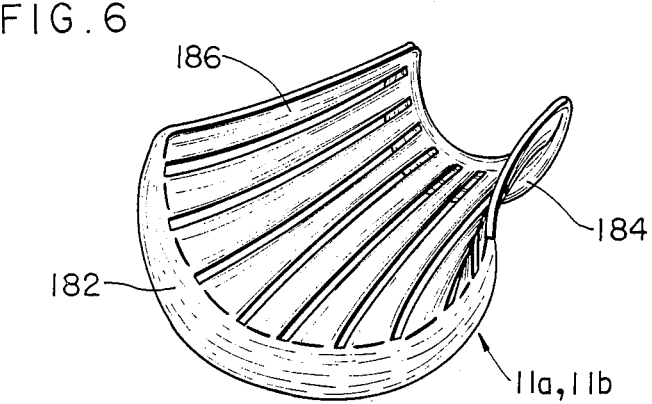
FIG. 6 is a perspective view of a horizontal deflection coil.
Figure 7:
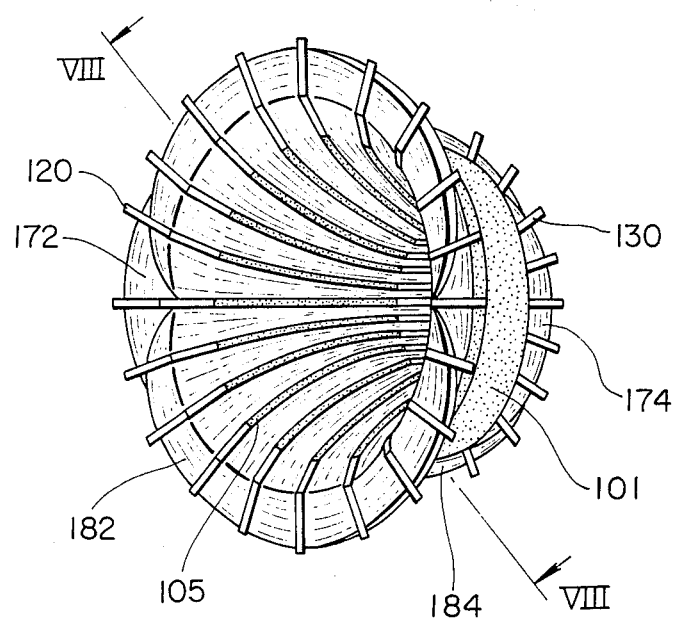
FIG. 7 is a perspective view showing an external appearance of the deflection yoke unit.
Figure 8:
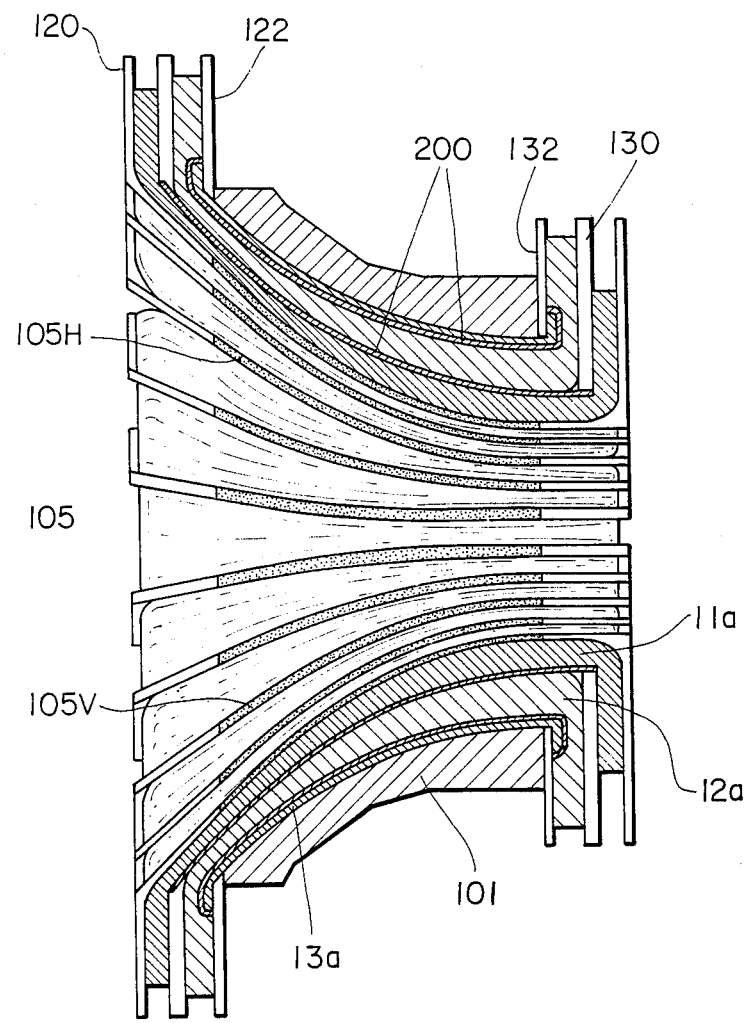
FIG. 8 is a sectional view of the deflection yoke unit.
Figure 9A:
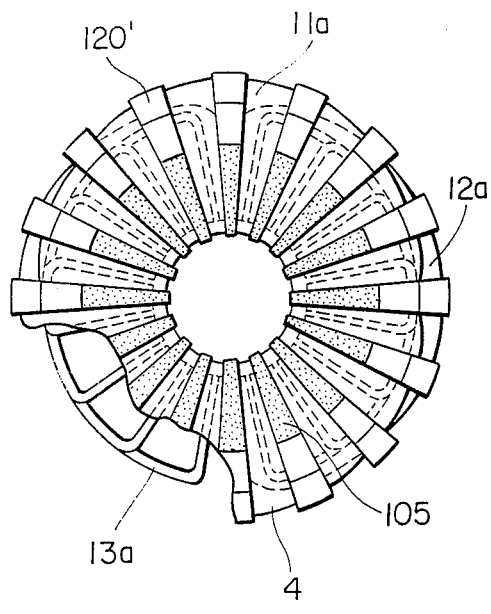
FIGS. 9(A), 9(B) and FIGS. 10(A), 10(B) show different examples of deflection yoke unit.
Figure 9B:
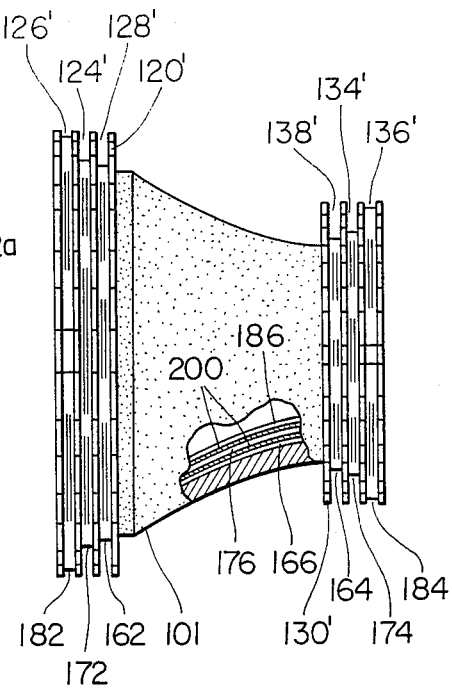
Figure 10A:
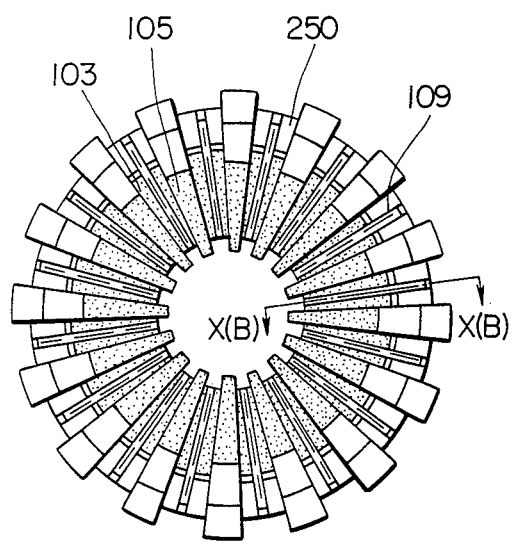
Figure 10B:
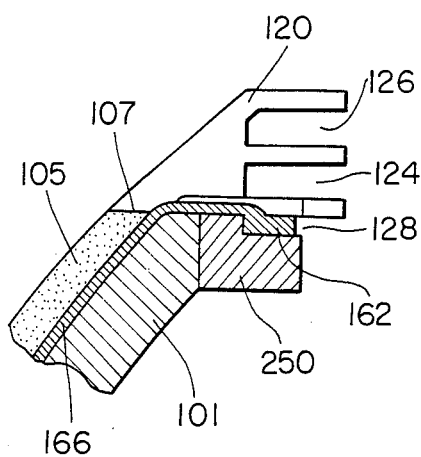

As shown in FIGS. 2(A) and 2(B), a ferrite core 101 is conical having a circular crosssection and has on its inner peripheral wall twenty lugs 105 which define twenty slots 103. A bobbin claw member 120 as shown in FIG. 3(A) is mounted, through its side surface 122, to one end 107 of each lug 105 facing the fluorescent screen. Similarly, a bobbin claw member 130 as shown in FIG. 3(B) is mounted, through its side surface 132, to the other end 109 of each lug 105 facing the bulb neck. The correction coils 13a and 13b, the vertical deflection coils 12a and 12b and the horizontal deflection coils 11a and 11b are sequentially mounted to the inner wall of the core 101 attached with the bobbin claw members 120 and 130. The coil 11a has a side conductor which is divided into a number of conductor segments 186. The respective coils 11b, 12a, 12b, 13a and 13b have similar conductor segments 186, 176, 176, 166 and 166. One conductor segment is received in one slot 103 of the core 101. One end conductor 162 of the correction coil 13a or 13b as shown in FIG. 4 is received in slots 124 of the bobbin claw members 120 and the other end conductor 164 is received in slots 134 of the bobbin claw members 130. The vertical deflection coil 12a or 12b as shown in FIG. 5 has one end conductor 172 overlying the end conductor 162 within the slot 124 and the other end conductor 174 overlying the end conductor 164 within the slot 134. The horizontal deflection coil 11a or 11b has one end conductor 182 received in slots 126 of the bobbin claw members 120 and the other end conductor 184 received in slots 136 of the bobbin claw members 130. The thus assembled deflection yoke unit 1 has an external appearance as shown in FIG. 7, which is sectioned on line VIII—VIII as shown in FIG. 8. There are also illustrated in FIG. 8 lugs 105 H and 105 V which coincide with the horizontal axis and vertical axis, respectively, and insulating paper layers 200 for electrical insulation between the respective coil sets. The set of horizontal deflection coils 11a and 11b posture vertically, and the set of vertical deflection coils 12a and 12b and the set of correction coils 13a and 13b posture horizontally.

According to an example manufactured by the inventors of this application, the core 101 and the bobbin claw members 120 and 130 are dimensioned as listed in Table 1, and the number of turns of the respective sets of horizontal deflection coils 11a and 11b, vertical deflection coils 12a and 12b and correction coils 13a and 13b is distributed as listed in Table 2. In numbering slots as shown in Table 2, twenty slots are divided into groups of five slots which are respectively involved in four quadrants defined by the horizontal and vertical axes and the five slots in each quadrant are assigned I to V by sequentially numbering from the horizontal axis to the vertical axis.

TABLE 1

| Dimension of Core | H | 54 |
|---|---|---|
| | D | φ115 |
| Dimension of Bobbin Claw Members | l₁ | 35 |
| | l₂ | 35 |
| | W₁ | 14.5 |
| | W₂ | 14.5 |

TABLE 2

| Slot number | Number of Turns | | | | | | Inductance (μH) |
|---|---|---|---|---|---|---|---|
| | I | II | III | IV | V | Total | |
| Horizontal Deflection Coil | 5 | 3 | 2 | 3 | 1 | 14 | 28.5 |
| Vertical Deflection Coil | 0 | 8 | 8 | 11 | 12 | 39 | 1060 |
| Upper and Lower Pincushion Distortion Correction Coil | 0 | 4 | 4 | 5 | 5 | 18 | 59 |

To form an electric wire of the vertical deflection coil, 98 strands are used in such a manner that from 49 strands, 7 sets of litz wires are prepared by stranding 7 strands to form each set of litz wires and from the remaining 49 strands, the other 7 sets of litz wires are similarly prepared, and finally two of 7 sets of litz wires are further stranded and connected in parallel to form a double litz wire. The resulting double litz wire is wound in 39 turns in total. The correction coil has an electric wire of only one set of litz wires which is prepared by stranding 7 strands, and the resulting set of litz wires is wound in 18 turns in total. By using the litz wires, high frequency loss such as eddy current loss can be reduced.

As will be seen from Table 2, the set of vertical deflection coils 12a and 12b is greater than the set of correction coils 13a and 13b for correcting the upper and lower pincushion distortions in terms of the number of turns or inductance and the coil conductor mass quantities, but both the sets are substantially analogous to each other in terms of winding density distribution so that substantially identical field distributions can be formed by the two sets. Consequently, the set of correction coils 13a and 13b will not disturb the vertical deflection field distribution, having no adverse influence upon the conditions for electron beam landing on the fluorescent screen and focussing of the electron beam.

Further, the number of turns of the correction coil set is made small to ensure that the correction coil set can have a small inductance or impedance which is suited for matching with the correction circuit 6. Moreover, due to the fact that the coil conductor mass quantity of the set of correction coils 13a and 13b is small and that the set of correction coils 13a and 13b is spaced from the set of horizontal deflection coils 11a and 11b by a thickness of the set of vertical deflection coils 12a and 12b, the capacitive coupling can be decreased and as a result, the ringing can be decreased.

Referring to FIGS. 9(A), 9(B) and 10(A), 10(B), there are illustrated different examples of deflection yoke unit according to the invention. In an example of FIGS. 9(A) and 9(B), bobbin claw members 120' and 130' are employed, each of which has three slots dedicated to separate reception of respective horizontal deflection, vertical deflection and correction coil sets. Specifically, twenty bobbin claw members 120' have each three slots 124', 126' and 128', and twenty bobbin claw members 130' have each three slots 134', 136' and 138'. An insulating paper layer 200 is interposed between side conductors of the respective coil sets. In an example of FIGS. 10(A) and 10(B), the bobbin claw member 120 or 130 cooperates with a ring member 250 to define a slot adapted for posturing the correction coil. Also provided for the inner wall of the core 101 are slots 109 which are adapted for posturing sets of correction coils 13a and 13b. These slots 109 are effective to maintain accurate configuration of the correction coils 13a and 13b even when these coils are small in conductor mass quantity.

Although in the foregoing embodiment the set of correction coils for correcting the upper and lower pincushion distortions are placed in the slots provided on the inner wall of the core, these correction coils may be mounted to an ordinary deflection yoke in which horizontal deflection coils are wound on an ordinary core without slots on its inner wall and on bobbins with at least slots adapted for guiding coil windings.

We claim:

1. A pincushion distortion correction device comprising:
   a magnetic core having conical inner and outer wall surfaces;
   a set of correction coils having a side conductor provided on the inner wall surface of said magnetic core, and supplied with a pincushion distortion correction current;
   a set of vertical deflection coils having a side conductor overlaid on a layer formed on said side conductor of said correction coil set, and supplied with a vertical deflection current;
   damping means, connected to said vertical deflection coil set, for suppressing a ringing in the vertical deflection current; and
   a set of horizontal deflection coils having a side conductor overlaid on a layer formed of said side conductor of said vertical deflection coil set, and supplied with a horizontal deflection current,
   said correction coil having a number of turns which is smaller than the number of turns of said vertical deflection coil, and a winding density distribution which approximates the winding density distribution of said vertical deflection coil at respective positions on said magnetic core.

2. A pincushion distortion correction device according to claim 1 wherein said side conductor of each coil set is divided into a plurality of conductor segments which are spaced from each other.

3. A pincushion distortion correction device according to claim 2 wherein said magnetic core has a plurality of slots formed on the inner wall surface, and said side conductors of each set of coils are received in said slots.

4. A pincushion distortion correction device comprising:
   a magnetic core having conical inner and outer wall surfaces;
   a set of correction coils having a side conductor provided on the inner wall surface of said magnetic core, and supplied with a pincushion distortion correction current;
   a set of vertical deflection coils having a side conductor overlaid on a layer formed on said side conductor of said correction coil set, and supplied with a vertical deflection current;
   damping means, connected to said vertical deflection coil set, for suppressing a ringing in the vertical deflection current; and
   a set of horizontal deflection coils having a side conductor overlaid on a layer formed of said side conductor of said vertical deflection coil set, and supplied with a horizontal deflection current,
   said correction coil having a number of turns which is smaller than the number of turns of said vertical deflection coil, and a winding density distribution which approximates the winding density distribution of said vertical deflection coil,
   wherein said damping means includes damping resistor means connected in parallel with said vertical deflection coil set and a transformer connected between said vertical deflection coil set and said vertical deflection circuit, said damping resistor means being designed so as to prevent generation of a ringing in the vertical deflection current due to leakage of a horizontal component or its higher harmonics from said set of horizontal deflection coils to said set of vertical deflection coils through capacitive coupling, said transformer being designed to exhibit a low impedance against an antiphase component of a low frequency signal such as a vertical deflection frequency signal and a high impedance against an in-phase component of a high frequency signal such as a horizontal deflection frequency signal.

5. A pincushion distortion correction device comprising:
   a magnetic core having conical inner and outer wall surfaces;
   a set of correction coils having a side conductor provided on the inner wall surface of said magnetic core, and supplied with a pincushion distortion correction current;
   a set of vertical deflection coils having a side conductor overlaid on a layer formed of said side conductor of said correction coil set, and supplied with a vertical deflection current; and
   a set of horizontal deflection coils having a side conductor overlaid on a layer formed of said side conductor of said vertical deflection coil set, and supplied with a horizontal deflection current,
   said correction coil having a number of turns which is smaller than the number of turns of said vertical deflection coil, and a winding density distribution which approximates the winding density distribution of said vertical deflection coil at respective positions on said magnetic core.

6. A deflection system for a CRT comprising:
   horizontal deflection windings adapted for said CRT;
   a horizontal deflection circuit for supplying a horizontal deflection current to said horizontal deflection windings;
   vertical deflection windings adapted for said CRT;
   a vertical deflection circuit for supplying to said vertical deflection windings a vertical deflection current including a frequency component of said horizontal deflection current;
   means for suppressing a pincushion distortion based on said vertical deflection current; and
   means interposed between said vertical deflection windings and said vertical deflection circuit for exhibiting a low impedance at the frequency of said vertical deflection current and a high impedance at the frequency of said frequency component of said horizontal deflection current.

* * * * *